Patented July 19, 1949

2,476,642

UNITED STATES PATENT OFFICE 2,476,642

AMINO ANTHRAQUINONE DYESTUFFS CONTAINING AN AMINO STILBENE GROUP

Curt G. Vogt, Union, N. J., assignor to General Aniline & Film Corporation, New York, N. Y., a corporation of Delaware No Drawing. Application January 2, 1948, Serial No. 361

2 Claims. (Cl. 260—367)

The present invention relates to new dyestuffs of the anthraquinone series, more particularly to new derivatives of 1,4-diamino-anthraquinone-2-sulfonic acid of the general formula:

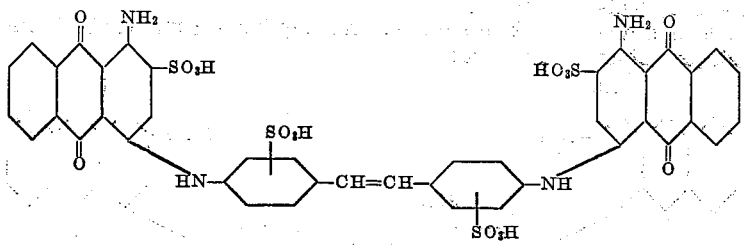

and the alkali metal and ammonium salts thereof.

The new dyestuffs are characterized by containing an amino-stilbene group carrying two sulfo groups and dye animal and nylon (linear polyamide) fibers from neutral or acid bath in bluish-red shades of good fastness properties. The compounds are of very limited solubility in water, even as the salts, and are applied to the dyeing of the fiber in the form of an aqueous dispersion using sodium lignin sulfonate and other suitable dispersing agent.

The capacity of the new dyestuffs to dye animal and nylon fibers from neutral bath is advantageous in the union dyeing of textiles where one of the fibers is sensitive to acids. For example, in the dyeing of mixed fibers of wool and cotton or of nylon and cotton with one of the new dyestuffs, the wool or nylon, as the case may be, is dyed in a bluish-red shade and the cotton, which remains undyed, is not tendered as would occur on using an acid bath for the dyeing. A preferred group of the dyestuffs for use in neutral dyeing are the ammonium salts of the dyestuffs.

The new dyestuffs are prepared by condensing 1-amino-4-halogeno-anthraquinone-2-sulfonic acid (halogen may be chlorine or bromine) or an alkali metal salt thereof with 4,4'-diamino-stilbene-2,2'-disulfonic acid or the corresponding 3,3'-disulfonic acid or an alkali metal salt thereof. The condensation is carried out by heating an aqueous slurry of the reactants in the presence of a copper catalyst for the condensation such as cuprous chloride, and of an acid-binding agent such as calcined sodium carbonate. The reaction can be carried out with exclusion of air from the hot reaction mass to obtain a product of highest purity, for which may be used an atmosphere of an inert gas such as nitrogen or carbon dioxide.

The alkali metal and ammonium salts of the dyestuffs can be prepared in conventional manner by treating the free acid dyestuff with an aqueous solution of a caustic alkali, e. g. sodium hydroxide, or of ammonia and heating the suspension of the dyestuff salt to dryness. The salts of the dyestuffs may be warmed with dilute aqueous hydrochloric acid to split out the free acid dyestuff, which, being insoluble in the acid, precipitates and can be collected by filtration.

The invention is further illustrated by the following specific example, to which, however, it is not to be limited. Parts are by weight.

Example

A mixture of 111 parts 4,4'-diamino-stilbene-2,2'-disulfonic acid with a purity of approximately 33.5% was slurried in 300 parts water. To this slurry was added 80.8 parts 1-amino-2-sulfo-4-bromoanthraquinone, sodium salt. Anhydrous sodium carbonate was used to neutralize the slurry and make it slightly alkaline to litmus paper. Approximately 20 parts sodium carbonate anhydrous were required to do this. An additional 23.3 parts sodium carbonate anhydrous were added, making the mixture strongly alkaline to phenolphthalein paper. Then 4 parts cuprous chloride were added, and the mixture was refluxed until the reaction was completed. This required approximately 11 hours. The reaction mixture was allowed to cool to room temperature and filtered. The residue was washed with water, then slurried with boiling ethyl alcohol. The insoluble material was filtered off, and the product washed with more ethyl alcohol and dried.

The product is the sodium salt of the dyestuff of the probable formula:

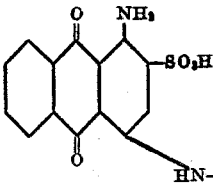 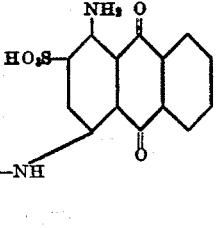

and dyes nylon a bluish-red shade of good fastness properties.

Alternatively, the new dyestuffs may be prepared by condensing in the manner described above, the 4,4'-diamino-stilbene-2,2'- or 3,3'-disulfonic acids with 1-amino-2,4-dihalogeno-anthraquinone and replacing the halogen atom (chlorine or bromine) in 2-position of the condensation product with the sulfonic acid group which, preferably, is done by treatment with an alkali metal sulfite in known way.

I claim:

1. An amino anthraquinone compound of the general formula:

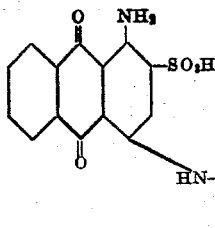 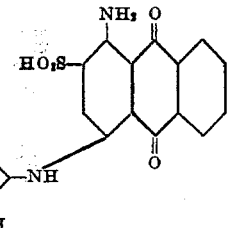

and the alkali metal and ammonium salts thereof.

2. An amino anthraquinone compound of the formula:

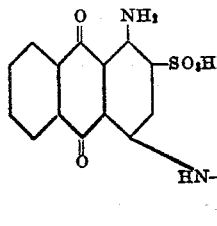 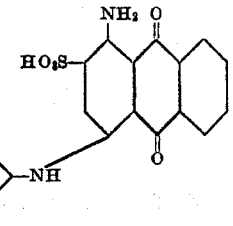

and the alkali metal and ammonium salts thereof.

CURT G. VOGT.

REFERENCES CITED

The following references are of record in the file of this patent:

UNITED STATES PATENTS

| Number | Name | Date |
|---|---|---|
| 1,871,852 | Kalischer et al. | Aug. 16, 1932 |
| 1,957,599 | Kalischer et al. | May 8, 1934 |
| 2,156,887 | Weinand | May 2, 1939 |